United States Patent [19]

Callahan et al.

[11] 4,045,392

[45] Aug. 30, 1977

[54] ALKYD RESIN MANUFACTURING PROCESS BY USING WATER OR STEAM TO REVERSE OR RETARD GELATION

[75] Inventors: William B. Callahan, Merion, Pa.; B. Frank Coe, Hockessin, Del.

[73] Assignee: E. I. Du Pont de Nemours and Company, Wilmington, Del.

[21] Appl. No.: 557,407

[22] Filed: Mar. 11, 1975

[51] Int. Cl.$^2$ .................... C08G 63/22; C09D 3/64
[52] U.S. Cl. ................................ 260/22 R; 260/75 M
[58] Field of Search ............. 260/22 M, 22 R, 75 M

[56] References Cited

U.S. PATENT DOCUMENTS

| | | | |
|---|---|---|---|
| 1,904,595 | 4/1933 | Adams | 260/22 R |
| 2,057,766 | 10/1936 | Brubaker | 260/22 R |
| 2,609,348 | 9/1952 | DuPuis et al. | 260/22 A |
| 2,843,556 | 7/1958 | Moorman | 260/863 |
| 2,892,813 | 6/1959 | Georgian et al. | 260/75 M |
| 2,993,029 | 7/1961 | Georgian et al. | 260/75 M |
| 3,039,980 | 6/1962 | Mallison | 260/22 M |
| 3,098,046 | 7/1963 | Siggel et al. | 260/2.3 |
| 3,108,082 | 10/1963 | Riehl et al. | 260/2.3 |
| 3,325,428 | 6/1967 | Graver et al. | 260/22 M |
| 3,390,135 | 6/1968 | Seiner | 260/22 M |
| 3,463,760 | 8/1969 | Barkey | 260/75 M |
| 3,491,115 | 1/1970 | Harrier | 260/32.6 |
| 3,818,071 | 6/1974 | Chilton | 260/475 A |

FOREIGN PATENT DOCUMENTS

| | | | |
|---|---|---|---|
| 1,131,202 | 6/1962 | Germany | 260/2.3 |
| 1,137,551 | 10/1962 | Germany | 260/22 CB |
| 360,173 | 11/1931 | United Kingdom | 260/22 R |
| 462,511 | 3/1937 | United Kingdom | 260/22 R |

OTHER PUBLICATIONS

Patton, Alkyd Resin Technology, Interscience Publishers, N.Y., N.Y., 1962, pp. 22-24.

*Primary Examiner* — Ronald W. Griffin

[57] ABSTRACT

An improved alkyd resin manufacturing process in which the alkyd resin is prepared by esterifying a polybasic acid and a polyhydric alcohol under reaction temperature conditions and water from the esterification is removed from the process; in the event gelation of the alkyd resin occurs in the process, the improvement that is used is the addition of sufficient water or steam while the alkyd resin is maintained at about reaction temperature conditions to reverse the gelation of the alkyd resin to form a gel-free liquid composition of the alkyd resin. Also, water or steam can be used in an alkyd resin manufacturing process to prevent or retard gelation of the resin.

Alkyd resins are widely used in paints and varnishes which are used for finish for wood, metal, polymer reinforced fiberglass and the like.

8 Claims, No Drawings

ALKYD RESIN MANUFACTURING PROCESS BY USING WATER OR STEAM TO REVERSE OR RETARD GELATION

BACKGROUND OF THE INVENTION

This invention is related to a process for the manufacture of alkyd resins and in particular to an improvement in this process.

Conventional processes for the preparation of alkyd resins use an esterification reaction to react a polybasic acid and a polyhydric alcohol, and usually, an esterification catalyst is used. The reaction either uses a solvent or can be accomplished without the presence of a solvent. A problem arises at the completion of the process, since the reaction must be stopped rapidly. One technique that is used is to rapidly dissolve the resin in a solvent for the resin which is at a relatively low temperature, and this stops the reaction. If the reaction is not stopped, the resin will gel, crosslink, and harden in the reaction vessel, and very costly maintenance is required to remove the resin. At present, there is no technique known to reverse gelation of an alkyd resin to remove the resin from the reaction vessel or to make a useable product from a gelled alkyd resin.

The novel process of this invention not only stops the gelation of an alkyd resin, but reverses this gelation to form a composition suitable for use in paints and varnishes.

SUMMARY OF THE INVENTION

A conventional process for the manufacture of liquid alkyd resin compositions comprises esterifying a polybasic acid with a polyhydric alcohol under reaction temperature conditions and removing water as it is formed in the process; in the event gelation of the alkyd resin occurs in this process, the improvement that is used in combination with this process comprises the addition of a sufficient amount of water or steam while maintaining the alkyd resin at about reaction temperature conditions to reverse the gelation of the alkyd resin to form a liquid gel-free composition of the alkyd resin.

Another aspect of this invention is the addition of water or steam in the above alkyd resin process to prevent or retard gelation of the alkyd resin.

DESCRIPTION OF THE INVENTION

Alkyd resins are non-linear polymers prepared by an esterification reaction of a polybasic organic acid with a polyhydric alcohol. These resins usually include drying oils or drying oil fatty acids and can be modified with dibasic, tribasic or tetrabasic organic acids or anhydrides or monobasic organic acids.

In the manufacture of alkyd resins, the reactants of a polybasic organic acid polyhydric alcohol and catalyst are charged into a reaction vessel equipped with means to remove water from the process, such as a reflux condenser and a bubble cap column, and a heat source which can be a heat exchanger or a high pressure water or steam jacket on the vessel. The reactants are agitated by a mixer in the vessel or by circulating the reactants by a pump, for example, the reactants can be pumped from the bottom of the vessel through a pipe and heat exchanger and back into the vessel at the top. The reactants are brought to a reaction temperature and water is removed from the process as the alkyd resin is formed. At the completion of the process which is indicated by the high viscosity and low acid number of the alkyd resin, the resin is rapidly cooled to prevent gelation. This can be accomplished by rapidly adding the alkyd resin to a solvent or by adding solvent to the resin.

To avoid gelation of the alkyd resin in the above process or to reverse gelation of a gelled alkyd resin which can occur at the end of the above process, the improved process of this invention is utilized. Sufficient water or steam is added to a gelled alkyd resin to reverse gelation and form a liquid gel-free composition while retaining the alkyd resin at its reaction temperature. Water or steam is added to the reaction mixture at a rate or at least 0.02% per minute, based on the weight of the alkyd resin, while the alkyd resin is maintained at a temperature of about 200°–275° C.

Preferably, steam is used, since steam is easily introduced into the gelled alkyd resin and is readily dispersed through the gel and helps to maintain the resin at its reaction temperature. Under most conditions, steam is added at a rate of about 0.05 to 3% per minute, based on the weight of the alkyd resin.

Alkyd resins can be manufactured by either a solution process or a fusion process. In the solvent process, the reactants and catalyst are dissolved in a solvent for the reactants which is also a solvent for the resulting alkyd resins. In the fusion process, solvent are not used in the process.

Typical solvents that can be used in the solution process and that can be used to dilute an alkyd resin are as follows: xylene, toluene, mineral spirits, high solvency aromatic hydrocarbon solvents, slow evaporating high solvency hydrocarbon solvents, VM and P naphtha, petroleum ethers, aliphatic alcohols, ethylene glycol monoalkyl ethers, ethylene glycol monoalkyl ether acetates, and the like.

Typical esterification catalysts that are used in the process for preparing alkyd resins are as follows: barium oxide, barium hydroxide, barium naphthenate, calcium oxide, calcium hydroxide, calcium naphthenate, lead oxide, lead naphthenate, lithium hydroxide, lithium naphthenate, lithium ricinoleate, sodium hydroxide, sodium naphthenate, zinc oxide, and lead tallate.

Typical monobasic organic acids that can be used to prepare alkyd resins are as follows: abietic acid, benzoic acid, p-tert-butylbenzoic acid, caproic acid, caprylic acid, capric acid, castor fatty acid, coconut fatty acid, cottonseed fatty acid, crotonic acid, dehydrated castor oil fatty acid, 2-ethylhexoic acid, lauric acid, linoleic acid, linolenic acid, oleic acid, pelargonic acid, rosin acid, soya fatty acid, and tall oil fatty acid.

Typical dibasic organic acids and anhydrides that can be used to prepare alkyd resins are as follows: adipic acid, azelaic acid, chlorendic acid, chlorendic anhydride, fumaric acid, isophthalic acid, maleic anhydride, succinic acid, succinic anhydride, sebacic acid, and diglycolic acid.

Typical tribasic and tetrabasic organic acids that can be used to prepare alkyd resins are as follows: citric acid, trimelletic acid, trimelletic anhydride, pyromelletic acid and pyromelletic dianhydride.

Typical glyceride oils that are used to prepare alkyd resins are as follows: castor oil, heat-bodied soya oil, coconut oil, corn oil, cottonseed oil, dehydrated castor oil, linseed oil, oiticica oil, safflower oil, soybean oil, and tung oil.

Typical polyhydric alcohols that can be used to prepare alkyd resins are as follows: ethylene glycol, propylene glycol, 1,3-butylene glycol, pentanediol, neopentyl glycol, hexylene glycol, diethylene glycol, dipropylene glycol, triethylene glycol, glycerol, glycerine (99%), glycerine (95%), trimethylolethane, trimethylolpropane, pentaerythritol, methylglucoside, dipentaaerythritol, and sorbitol.

Typical monofunctional alcohols that can be used to prepare alkyd resins are as follows: butanol, pentanol, hexanol, isooctanol, ethoxyethanol, and butyl carbitol.

Typical alkyd resins on which the process of this invention can be used to reverse gelation or prevent gelation are as follows: linseed oil/tung oil/glycerin/phthalic anhydride; soya bean oil/heat-bodied soya bean oil/pentaerythritol/phthalic anhydride; soya bean oil/glycerine/phthalic anhydride; and linseed oil/tung oil/glycerin/isophthalic acid.

Alkyd resins in which gelation has been reversed or in which gelation has been stopped by using the process of this invention when compared to the same alkyd resin which as not been gelled are very similar in all properties, such as rate drying, film gloss and hardness, and the like. Molecular weight determination by gel permeation chromatography of these resins indicates the presence of a small fraction of high molecular weight resin in comparison to conventional resins, but this fraction does not change the properties of the resin and the resin can be used in paints and varnishes to provide high quality products.

Alkyd resin paints and varnishes are widely used in the home and in industry to coat metals, plastic, polymer reinforced fiber glass, wood, and the like.

The following Examples illustrate the invention. All parts and percentages are on a weight basis unless otherwise indicated.

EXAMPLE 1

An alkyd resin solution is formed by charging the following constituents into a three-neck reaction vessel equipped with a heat source, an agitator, a sample tube, a thermometer, a metal tube that extends under the agitator to inject steam into the vessel, a reflux condenser with a water collector:

| Portion 1 | Parts by Weight |
| --- | --- |
| Linseed oil (varnish grade) | 567.6 |
| Tung oil | 243.1 |
| Glycerin | 174.7 |
| Lead tallate drying solution (68% solids of lead tallate containing 24% lead in mineral spirits) | 1.2 |
| Portion 2 | |
| Phthalic anhydride | 598.2 |
| Glycerin | 111.5 |
| Portion 3 | |
| Hydrocarbon solvent (high solvency hydrocarbon containing 95% aromatic solvents having a distillation range of 150–190° C. and an aniline point of 36–39° C.) | 277.8 |
| Portion 4 | |
| Xylene | 83.2 |
| Hydrocarbon solvent (described above) | 320.6 |
| Hydrocarbon solvent (slow evaporating high solvency hydrocarbon having a distillation range of 218–219° C. and an aniline point of 30–40° C.) | 533.6 |
| Mineral spirits (petroleum fraction of aliphatic hydrocarbons having a distillation range of 145–215° C. and an aniline point of 53–61° C.) | 404.9 |
| Total | 3316.4 |

The constituents of Portion 1 are added in the order as shown to the reaction vessel and then heated to 232° C. then held at this temperature for 15 minutes. A sample is removed to test for half ester formation. The sample is diluted with 3 parts of methanol to one part of sample and a clear solution results which indicates formation of half esters.

The heat is turned off to the reaction vessel and the constituents of Portion 2 are added in the order shown with constant agitation of the resulting reaction mixture. After Portion 2 is added, about one-half of Portion 3 is added with mixing and then the reaction mixture is cooled to room temperature and the remainder of Portion 3 is added with mixing. The reaction mixture is heated to its reflux temperature and held at its reflux temperature for about three and one-half hours. The temperature reached at the end of the three and one-half hour period is about 212° C. A sample is removed from the mixture and the viscosity and the acid number are determined. A Gardner Holdt viscosity is determined on a 50% solids in a solvent mixture used in the reaction and is Z + ⅛ and the acid number is 15.2. After only a short period of time, the batch began to gel as evidenced by loss of flow of the reaction mixture.

Low pressure steam at 100° C. is injected into the reaction mixture for a 54-minute period at a rate of about 0.12% by weight per minute, based on the weight of solid constituents in the reaction mixture. Seventeen minutes after the steam injection began, a sample is removed and the acid number and viscosity are determined. The acid number of the sample is 14.7 and the Gardner Holdt viscosity is Z1 + ⅜ measured as above. A second sample is removed 34 minutes after the steam injection was started, the acid number of the sample is 15.5 and the Gardner Holdt viscosity is Z1 + ⅜. A third sample is removed 44 minutes after steam injection and the acid number is 15.8 and the Gardner Holdt viscosity is Z1 − ⅛.

The molecular weight of the sample is determined by gel permeation chromatography and compared to a standard sample which did not gel. The above prepared composition had high molecular weight fractions, but otherwise is similar in composition to a conventional alkyd resin which had not gelled.

No difference in drying time of the above-prepared alkyd resin in comparison to a regular alkyd resin is noted. Drying time is measured on a sample drawn down on a glass plate with a wire rod and noting the time it took for the sample to dry is noted.

It is expected that the above prepared alkyd resin composition would form paints of high quality, such as enamels or varnishes, which would not be different from paints prepared with alkyd resins which had not gelled.

EXAMPLE 2

The following ingredients are charged into a conventional alkyd resin kettle equipped with an inert gas sprager for removal of water, an agitator and a high pressure water heating jacket:

| Portion 1 | Parts by Weight |
| --- | --- |
| Soya bean oil (varnish grade) | 67.60 |

| -continued | |
|---|---|
| Heat-bodied soya bean oil | 147.20 |
| Portion 2 | |
| Pentaerythritol | 45.40 |
| Powdered litharge | 0.11 |
| Portion 3 | |
| Phthalic anhydride | 74.25 |
| Portion 4 | |
| Mineral spirits | 50.00 |
| Mineral spirits (odorless) | 347.20 |
| Total | 731.76 |

Portion 1 is charged into the reaction vessel and blanketed with an inert gas and heated to about 65° C. with a constant agitation until the ingredients reach a Gardner Holdt viscosity of about G-H measured at 50% solids in a mixed organic solvent utilized in the process and measured 25° C. Portion 2 is then added and then the reaction mixture is heated to about 232° C. and the reaction is continued until a half ester is formed as determined by the test described in Example 1. Portion 3 is added and the reaction is continued at about 232° C. and an inert gas is passed through the reaction mixture to remove water resulting from the reaction. The reaction is continued until the mixture has an acid number of about 6-10 and a Gardner Holdt viscosity, determined as above, of about X-Y. Viscosity and acid number are determined on samples that are removed periodically from the reaction mixture.

When the reaction mixture reaches the above viscosity and acid number range, a valve at the bottom of the reaction vessel is opened to charge the reaction mixture with the solvents of Portion 4 in a mixing vessel. The valve was blocked by high viscosity material and the reaction continued in the vessel and the mixture started to gel.

Low pressure steam at 100° C. is forced into the reaction mixture at a rate of about 0.05-0.1% per minute, based on the weight of the solids in the reaction mixture, for about 20-25 minutes, while the reaction mixture is held at about 210° C. Samples are removed from the reaction mixture during this time and viscosity and acid number are measured. Gelation of the mixture is effectively reversed and the resulting mixture has an acid number of about 30 and a Gardner Holdt viscosity of about X, measured as above. The resulting mixture is then added to Portion 4 to form an alkyd resin solution without gel particles. Testing the resulting alkyd resin solution, as in Example 1, showed that the alkyd resin solution is acceptable for use in commercial paints and varnishes.

We claim:

1. In a process for the manufacture of liquid alkyd resins which comprises esterifying a polybasic acid with a polyhydric alcohol under reaction temperature conditions and removing water as formed in the process; in the event gelation of the alkyd resin occurs in the process, the improvement in combination therewith which comprises the addition of sufficient steam at a rate of at least 0.02% by weight, based on the weight of the alkyd resin, per minute until a gel free composition is formed to reverse the gelation of the alkyd resin while maintaing the alkyd resin at reaction temperature conditions of about 200°-275° C.

2. The process of claim 1 in which steam is added at a rate of about 0.05 to 3% by weight, based on the weight of the alkyd resin, per minute.

3. The process of claim 2 in which the alkyd resin is manufactured by a solution process in which the polybasic acid and polyhydric alcohol are dissolved in a solvent for the constituents and for the resulting alkyd resin.

4. The process of claim 2 in which the alkyd resin is manufactured by a fusion process without the presence of solvent.

5. The process of claim 2 in which the alkyd resin is the esterification product of a drying oil, a polyfunctional polyol and an aromatic dicarboxylic acid or anhydride.

6. The process of claim 5 in which the alkyd resin is the esterification product of linseed oil, tung oil, glycerin and phthalic anhydride.

7. The process of claim 5 in which the alkyd resin is the esterification product of soya bean oil, heat-bodied soya bean oil, pentaerythritol, and phahtlic anhydride.

8. In a process for the manufacture of a liquid alkyd resin composition which comprises esterifying a polybasic acid with a polyhydric alcohol under reaction temperature conditions and removing water as formed in the process; the improvement used therewith which comprises the addition of sufficient steam at a rate of 0.05 to 3.0% by weight, based on the weight of the alkyd resin, per minute to retard gelation of the alkyd resin to form a gel-free composition of the alkyd resin while maintaining the alkyd resin at reaction temperature conditions of about 200°-275° C.

* * * * *